Aug. 2, 1949.　　　　　　J. I. GARSIDE　　　　　　2,477,733
GRINDING MACHINE
Filed March 26, 1948　　　　　　　　　　　　　7 Sheets-Sheet 1

Inventor
John I. Garside

By Harold W. Eaton
Attorney

John I. Garside
By Harold W. Eaton
Attorney

Aug. 2, 1949.     J. I. GARSIDE     2,477,733
GRINDING MACHINE
Filed March 26, 1948                    7 Sheets-Sheet 3
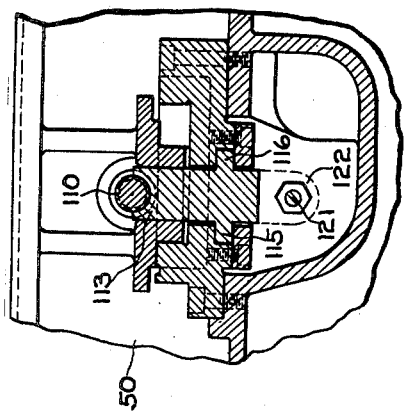
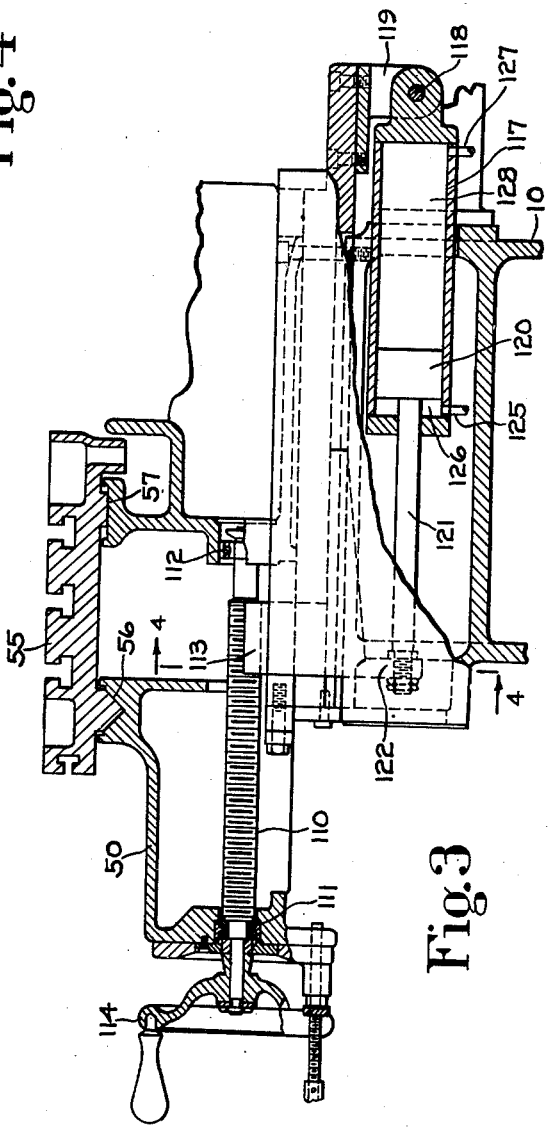
Inventor
John I. Garside
By Harold W. Eaton
Attorney Aug. 2, 1949.                    J. I. GARSIDE                    2,477,733
                                GRINDING MACHINE
Filed March 26, 1948                                          7 Sheets-Sheet 4

Inventor
John I. Garside

By Harold W. Eaton
                Attorney

Aug. 2, 1949.   J. I. GARSIDE   2,477,733
GRINDING MACHINE
Filed March 26, 1948   7 Sheets-Sheet 5

Inventor
John I. Garside

By Harold W. Eaton
Attorney

Aug. 2, 1949. J. I. GARSIDE 2,477,733
GRINDING MACHINE
Filed March 26, 1948 7 Sheets-Sheet 6
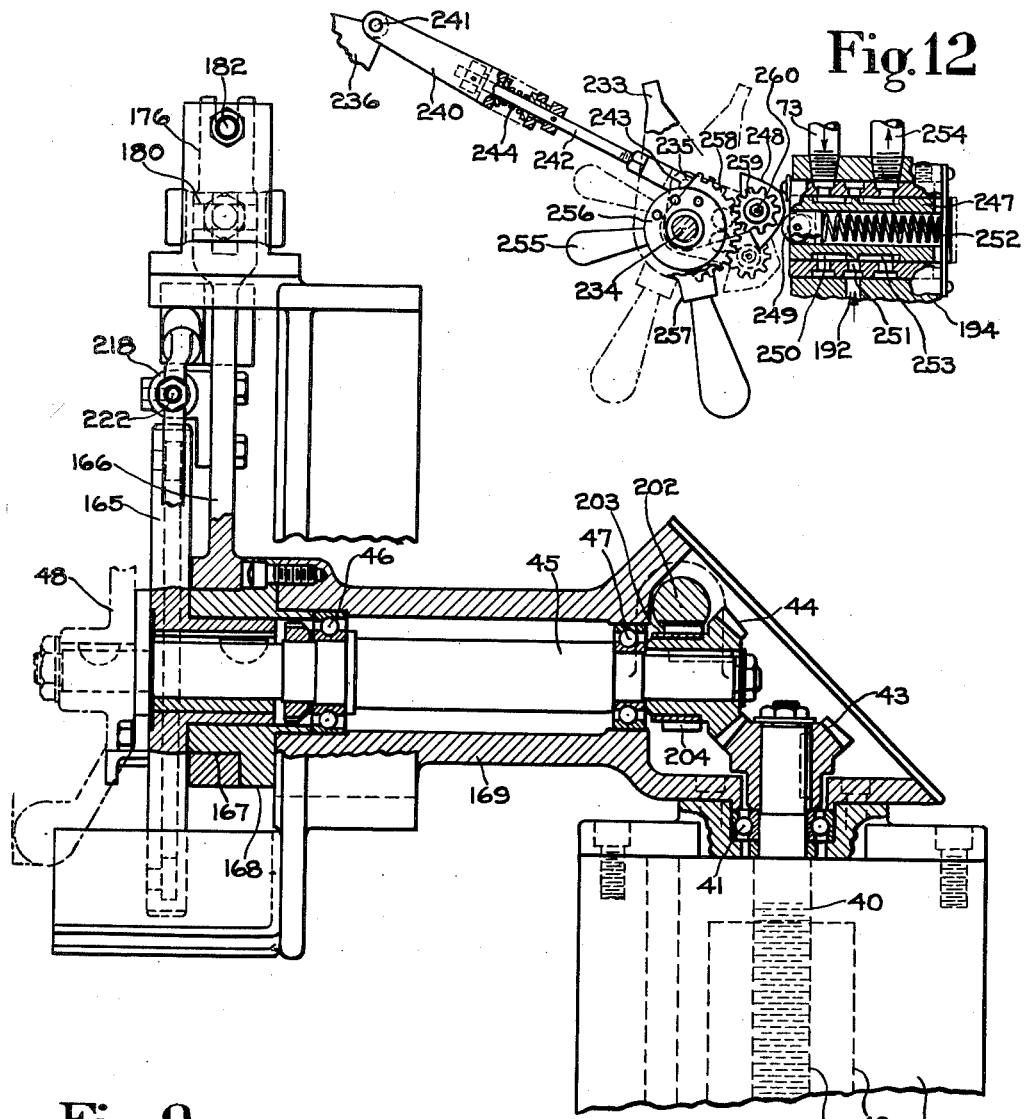
Inventor
John I. Garside
By Harold W. Eaton
Attorney

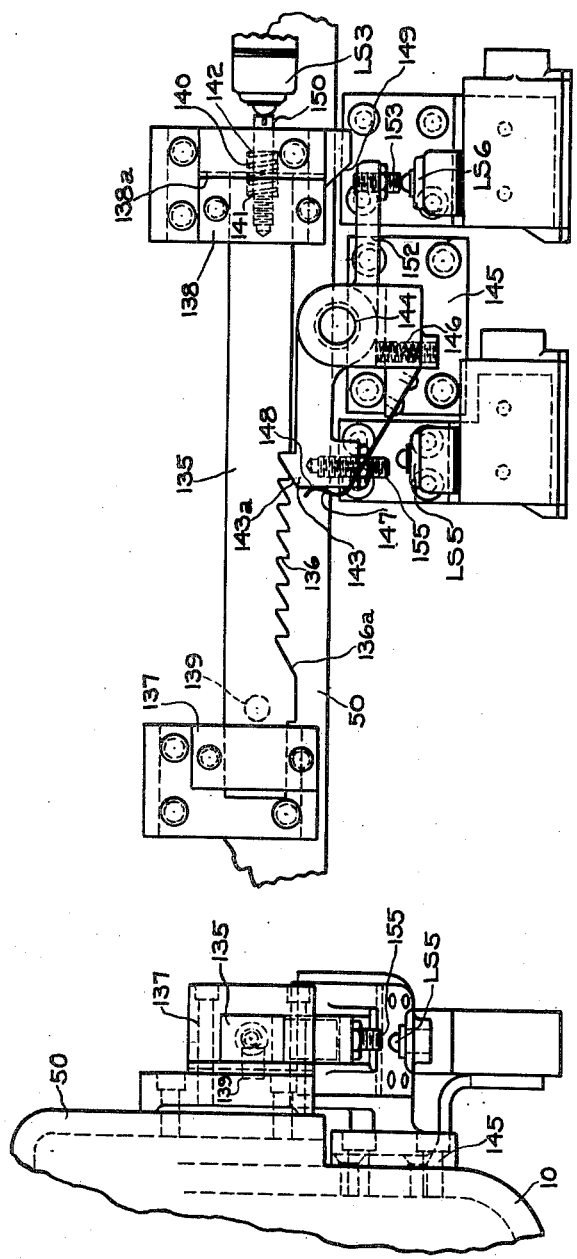

Patented Aug. 2, 1949

2,477,733

UNITED STATES PATENT OFFICE 2,477,733

GRINDING MACHINE

John I. Garside, West Boylston, Mass., assignor to Norton Company, Worcester, Mass., a corporation of Massachusetts Application March 26, 1948, Serial No. 17,137

14 Claims. (Cl. 51—92)

The invention relates to grinding machines, and more particularly to an automatically controlled hydraulically operated machine for grinding a plurality of spaced parallel grooves in a work piece.

One object of the invention is to provide a simple and thoroughly practical grinding machine for automatically grinding a plurality of spaced parallel grooves to predetermined dimensions. Another object of the invention is to provide an automatically operated indexing mechanism for indexing the work supporting table transversely to position the work piece being ground relative to the grinding wheel for grinding a plurality of spaced parallel grooves. Another object of the invention is to provide an automatic transverse carriage indexing mechanism which is arranged to automatically index the work carriage transversely when the work table is at one end of its longitudinal stroke.

Another object of the invention is to provide an automatically actuated wheel feeding mechanism for intermittently feeding the wheel toward the work, successively to grind a plurality of spaced grooves to predetermined sizes. Another object of the invention is to provide a wheel feeding mechanism for feeding the grinding wheel in a substantially vertical direction to grind grooves in a work piece to predetermined sizes. Another object of the invention is to provide an automatically controlled mechanism for automatically indexing the work supporting table and carriage transversely to position the work piece relative to the grinding wheel after one portion of the work piece has been ground to predetermined limits. Other objects will be in part obvious or in part pointed out hereinafter.

The invention accordingly consists in the features of construction, combinations of elements, and arrangements of parts, as will be exemplified in the structure to be hereinafter described and the scope of the application of which will be indicated in the following claims.

In the accompanying drawings in which is shown one possible embodiment of the mechanical features of this invention, Fig. 1 is a perspective view of the improved grinding machine, having parts broken away and shown in section to more clearly illustrate a portion of the hydraulic actuating and control mechanism;

Fig. 3 is a fragmentary cross sectional view, on an enlarged scale, through the work carriage transverse feeding and indexing mechanism;

Fig. 4 is a fragmentary cross sectional view, taken approximately on the line 4—4 of Fig. 3, through the feed screw and half nut;

Fig. 8 is a fragmentary right hand side elevation of the wheel feeding mechanism as shown in Fig. 7, having parts broken away and shown in section to show the driving connection between the feed wheel and the vertical feed screw;

Fig. 9 is a fragmentary elevation, on an enlarged scale, of the transverse index control mechanism for the work carriage;

Fig. 10 is a left hand end elevation of the transverse index control mechanism, as shown in Fig. 9;

Fig. 11 is a fragmentary transverse vertical sectional view through the work table and carriage showing the control mechanism therefor; and Fig. 12 is a fragmentary horizontal sectional view, on an enlarged scale, through the down feed control valve combined with a plan view of the actuating mechanism therefor.

Figure 1:
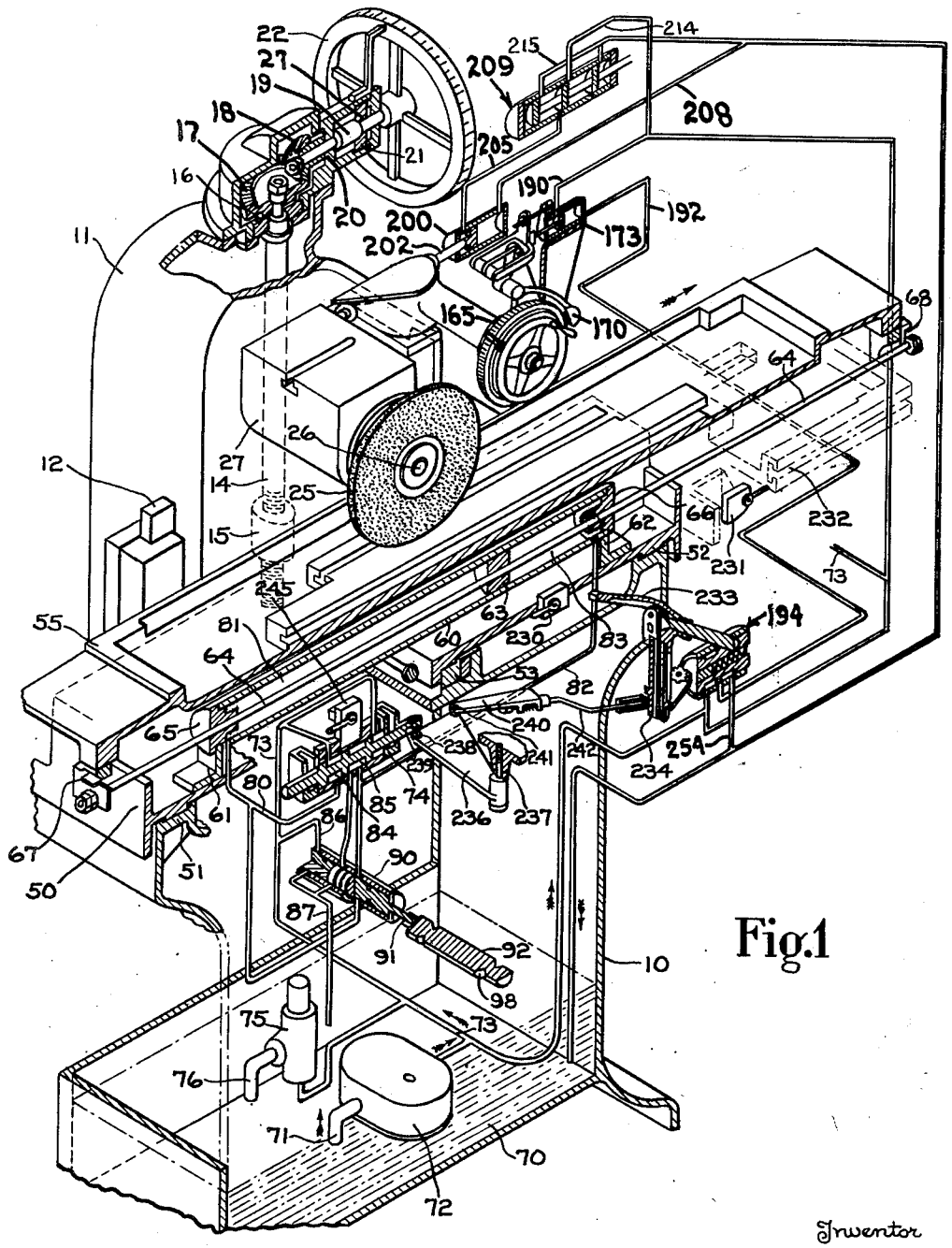

As illustrated in the drawings the machine embodying this invention comprises a base 10 which supports a vertically movable wheel slide 11. The wheel slide 11 is provided with opposed parallel guide ways 12 and 13 (Figs. 1 and 6) which are arranged on opposite sides of the vertical slide 11. A feeding mechanism is provided for manually adjusting the slide 11 in a vertical direction comprising a feed screw 14 and a nut 15. The feed screw 14 is supported at its upper end by an anti-friction bearing 16. The nut 15 is fixedly mounted on or formed integral with the base 10. A beveled gear 17 is mounted on the upper end of the feed screw 14. The beveled gear 17 meshes with a beveled gear 18 which is mounted on the end of a horizontal shaft 19. The shaft 19 is rotatably supported by spaced anti-friction bearings 20 and 21. A hand wheel 22 is mounted on the other end of the shaft 19 by means of which the screw 14 may be rotated vertically to adjust the position of the slide 11.

Figure 6:
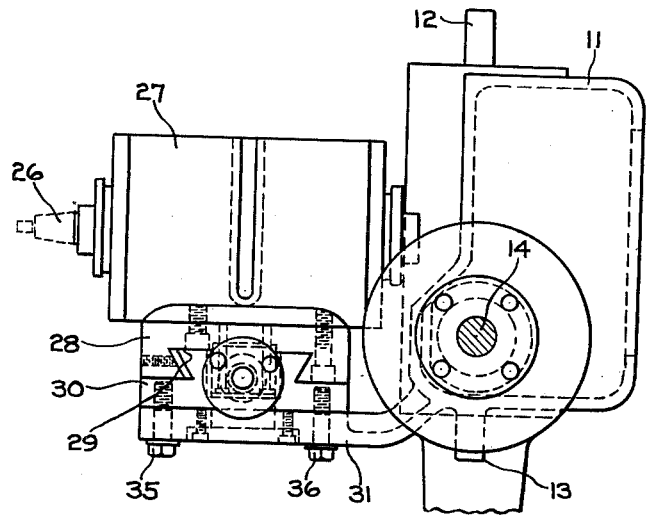
Fig. 6 is a fragmentary plan view of the vertically movable wheel slide.
Figure 5:
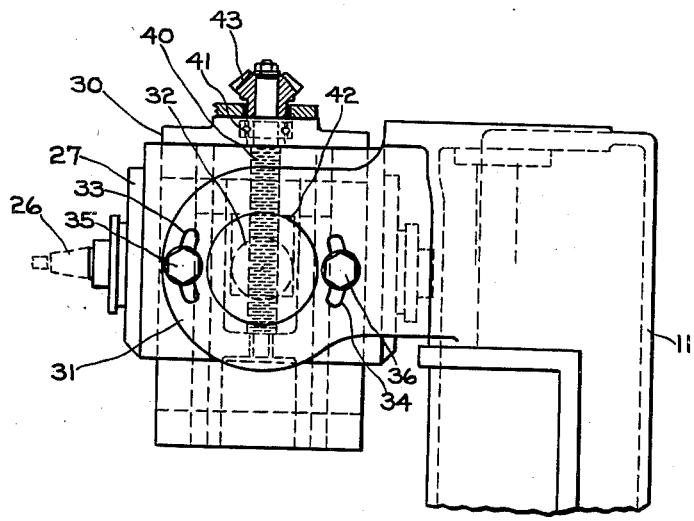
Fig. 5 is a fragmentary right hand side elevation of the upper portion of the vertically movable wheel slide.

A grinding wheel 25 is supported on a wheel spindle 26. The grinding wheel 25 may be rotated by any suitable means such as for example a unitary motor and spindle unit 27 in which the wheel spindle 26 is formed as the armature shaft of the driving motor. The motor unit is fastened to a slide 28. The slide 28 is provided with a dove-tailed slide way 29 which mates with a correspondingly shaped way formed on a supporting plate 30 (Fig. 5 and 6). The vertically movable slide 11 is provided with a forwardly extending arm 31 which serves as a support for the plate 30 and the grinding wheel unit above described.

To facilitate grinding of undercut grooves and undercut faces on a work piece, it is desirable to provide an angular adjustment for the grinding wheel so that the wheel may be fed in a desired angular direction as the work piece is reciprocated. As shown in the drawings, the arm 31 is provided with a trunnion stud 32 which mates with a correspondingly shaped aperture in the plate 30. To facilitate angular adjustment of the plate 30, a pair of elongated arcuate slots 33 and 34 (Fig. 5) are provided in the projection 31. Clamping screws 35 and 36 pass through the arcuate slots 33 and 34 respectively and are screw threaded into the plate 30. It will be readily apparent from the foregoing disclosure that by loosening the clamping screws 35 and 36, the plate 30 together with the slide 28 and the grinding wheel unit 27 may be angularly adjusted so that the grinding wheel may be fed in a direction at an angle to a vertical plane to facilitate grinding an undercut groove in the work piece.

To facilitate adjustment of the slide 28 relative to the plate 30, a feed screw 40 is carried by a bearing 41 on the slide 28. The feed screw 40 meshes with a nut 42 which is supported on the plate 30. A beveled gear 43 is mounted on the upper end of the feed screw 40. The beveled gear 43 meshes with a beveled gear 44 which is supported on one end of a horizontally extending shaft 45 (Fig. 8). The shaft 45 is journalled in spaced anti-friction bearings 46 and 47. A hand wheel 48 is keyed to the outer end of the shaft 47 by means of which the feed screw may be manually adjusted to adjust the position of the grinding wheel and its supporting slide 28. Automatically actuated mechanism is provided for automatically turning the shaft 45 as will be described hereinafter.

A transversely movable carriage 50 is supported on the base 10 by means of a pair of spaced parallel flat ways 51 and 52 (Fig. 1). A gibbed way 53 serves to cause the carriage 50 to move in a transverse direction which is substantially parallel with the axis of the grinding wheel 25.

The carriage 50 serves as a support for a longitudinally movable work table 55. The table 55 is supported by a V-way 56 and a flat way 57 (Fig. 3). The upper surface of the table 55 serves as a support for a work piece 58 to be ground.

The work table 55 is arranged to be reciprocated hydraulically in a manner substantially as that shown in the prior U. S. Patent No. 2,080,976 to Wallace H. Wood, dated May 18, 1937, to which reference may be had for details of disclosure not contained herein. The table reciprocating mechanism may comprise a hydraulic cylinder 60 which is supported by a pair of spaced brackets 61 and 62 on the transversely movable cariage 50. The cylinder 60 contains a slidably mounted piston 63 which is fixedly mounted on a double end piston rod 64. The piston rod 64 passes a pair of cylinder heads 65 and 66 which enclose opposite ends of the cylinder 60. The opposite ends of the piston rod 64 are connected by a pair of brackets 67 and 68 which depend from opposite ends of the longitudinally movable table 55. A source of fluid under pressure is provided comprising a reservoir 70 formed in a box-like portion of the base 10. Fluid is drawn from the reservoir 70 through a pipe 71 by means of a motor-driven fluid pump 72. The fluid pump 72 forces fluid under pressure through a pipe 73 to a table control valve 74. A relief valve 75 is connected to the pipe 73 by means of which excess fluid under pressure within the fluid system may be returned through a pipe 76 into the reservoir.

The control valve 74 is a piston type control valve which is arranged to reverse the direction of flow of fluid under pressure to and from the oposite ends of the cylinder 60. This valve is identical with that shown in the prior patent above referred to. Consequently, this valve will not be described in detail. In the position of the valve 74 (Fig. 1), fluid under pressure in the pipe 73 passes through a valve chamber 84 and out through a pipe 80 into a cylinder chamber 81 which causes the piston 63 and the table 55 to move toward the right (Fig. 1). During this movement of the table 55, fluid within the cylinder chamber 83 may exhaust through a pipe 82, through a valve chamber 85 and out through a pipe 86. Fluid under pressure passing through the pipe 86 passes to a combined start and stop and throttle valve 90. The valve 90 is a piston type valve comprising a stem 91 having an actuating knob 92 fixedly mounted on its outer end. The fluid exhausting from the pipe 86 passes through a V-port 93 in the valve 90 and out through an exhaust pipe 87 into the reservoir 70. By regulating the aperture of the V-port, the speed of movement of the table 55 may be readily adjusted. The adjustment of the V-port is obtained by a rotary adjustment of the actuating knob 92. When the valve stem 91 is moved in an axial direction, the valve 90 functions as a stop and start valve. This valve is identical with that shown in the prior U. S. patent above referred to, to which reference may be had for details of disclosure not contained herein. The start and stop valve 90 may be actuated manually by means of the knob 92 to start reciprocation of the work table 55.

It is desirable to provide automatic means for actuating the valve 90 to stop the reciprocating motion when desired. A lever 95 (Figs. 1 and 11) is mounted on the upper end of a rock shaft 96. A yoked member 97 is mounted on the lower end of the rock shaft 96 having projecting studs engaging the groove 98 formed in the knob 92. A table dog 99 is arranged in the path of a projection 100 formed integral with the lever 95. When the table moves to an extreme right hand end position, the dog 99 engages the projection 100 and rocks the lever 95 in a clockwise direction (Fig. 1) to cause a rearward movement of the knob 92 and valve stem 91 to close the V-port 93 and thereby cut-off the exhaust of fluid from the table cylinder 60 to stop the table movement.

A manually operable traverse mechanism is provided for manually positioning the table 55 when desired. This mechanism comprises a hand wheel 105 which is mounted on the forward end of the rotatable shaft 106. The shaft 106 is journalled in suitable bearings (not shown) carried by the carriage 50. The inner end of the shaft 106 supports a gear 107 which is arranged to mesh with a rack bar 108 depending from the underside of the table 55. The shaft 106 is arranged so that it may be moved axially to throw the gear 107 either into mesh with or out of mesh with the rack bar 108 so that the hand wheel 105 may be readily connected or disconnected to impart a manual transversing movement to the table 55.

A transversing mechanism is provided for transversing and indexing the carriage 50 transversely either manually or automatically by power. This mechanism may comprise a rotatable feed screw 110 (Figs. 2 and 3) which is journalled in suitable anti-friction bearings 111 and 112. The feed screw 110 meshes with a half nut 113 which is carried by the base 10. A manually operable hand wheel 114 is mounted on the outer end of the feed screw 110 to facilitate manual adjustment of the carriage 50 in a transverse direction.

In order to move the carriage 50 rapidly in a transverse direction, the half nut 113 is slidably mounted relative to the base 10. The half nut 113 is provided with a pair of opposed parallel slide ways 115 and 116 which mate with correspondingly shaped ways formed on the base 10.

A hydraulically operated mechanism is provided for imparting a rapid transverse indexing movement to the carriage 50. This mechanism may comprise a hydraulic cylinder 117 which is pivotally connected by means of a stud 118 carried by a bracket 119 depending from a portion of the base 10. The cylinder 117 supports a slidably mounted piston 120 having a piston rod 121 which is connected with a depending lug 122 formed on the underside of the half nut 113. When fluid under pressure is passed through a pipe 125 into a cylinder chamber 126, the piston 120 together with the carriage 50 moves in a direction toward the right (Fig. 3). During this movement fluid within a cylinder chamber 128 may exhaust through a pipe 127. Similarly, when fluid under pressure is reversed, fluid under pressure passing through the pipe 127 into cylinder chamber 128 causes the piston 120 and the carriage 50 to move toward the left.

A suitable control valve 130 is provided for controlling the admission to and exhaust of fluid from the cylinder 117. The control valve 130 is preferably a piston type valve comprising a valve stem 131 having valve pistons 132, 133 and 134 formed integrally therewith. The valve stem 131 is preferably automatically controlled in timed relation with other mechanisms of the machine, as will be hereinafter described, by means of a solenoid S3.

Figure 2:
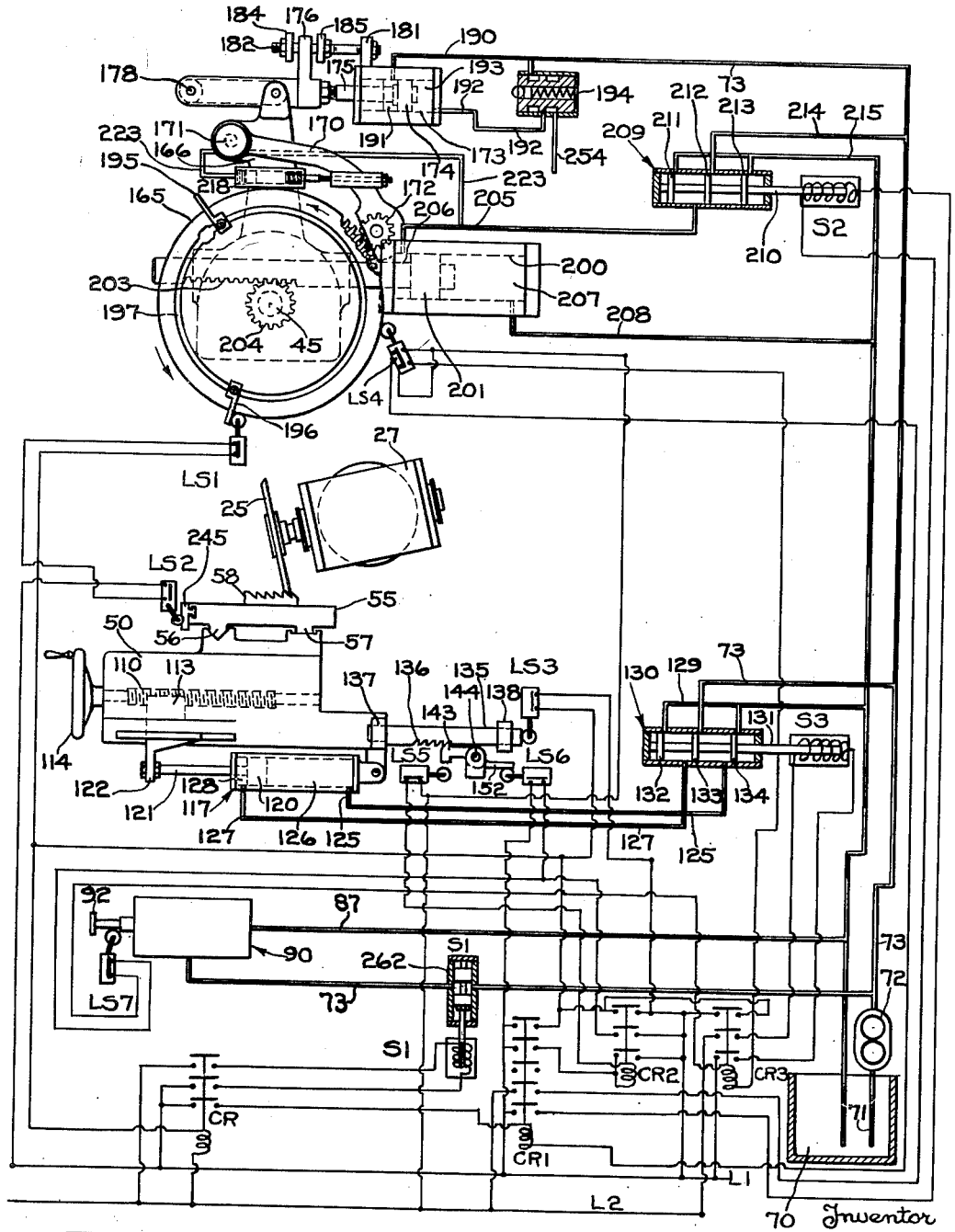
Fig. 2 is a combined hydraulic piping diagram and an electric wiring diagram of the actuating and control mechanism for the transverse indexing movement of the work support and the down feeding of the grinding wheel.

In the position of the valve 130 (Fig. 2) fluid under pressure in the pipe 73 enters a valve chamber located between valve pistons 133 and 134 and passes through the pipe 125 into the cylinder chamber 126 to cause the piston 120 and carriage 50 to move toward the left. During this movement, fluid from the cylinder chamber 128 exhausts through the pipe 127 into a valve chamber located between the valve pistons 132 and 133 and passes out through an exhaust pipe 129 into the reservoir 70. Similarly, when the solenoid S3 is energized, the valve stem 131 is moved toward the right (Fig. 2) to reverse the flow of fluid to the cylinder 117 to cause an indexing movement of the carriage 50 toward the left. In this position of valve 130, fluid under pressure from the pipe 73 enters the valve chamber located between the valve pistons 132 and 133 and passes through the pipe 127 into the cylinder chamber 128 formed at the left hand end of the cylinder 117 to cause the piston 120 and the carriage 50 to index toward the right (Fig. 2). During this latter indexing movement of the carriage 50, fluid within the cylinder chamber 126 exhausts through the pipe 125, through the valve chamber located between the valve pistons 133 and 134 and through the exhaust pipe 129 into the reservoir 70.

To facilitate a precise transverse indexing movement of the carriage 50 for successively positioning a work piece 58 relative to the grinding wheel 25 for grinding a plurality of spaced parallel grooves therein, a notched index bar 135 is provided having a plurality of notches 136 formed therein (Figs. 2 and 9). The number of notches 136 and the spacing thereof formed in the bar 135 corresponds with the number of grooves and the spacing thereof to be ground in the work piece 58. The notched index bar 135 is slidably supported in a pair of spaced brackets 137 and 138 which are mounted on the right hand end face of the carriage 50. A stud 139 which is fixedly mounted on the inner face of the bar 135 is arranged to engage the right hand end face of the bracket 137 (Fig. 9) so as to limit the movement of the bar 135 toward the left. A compression spring 140 is provided having its opposite ends supported respectively in a hole 141 formed in the end of the bar 135 and a hole 142 formed in the bracket 138. The spring 140 serves normally to urge the bar 135 toward the left (Fig. 9) normally to maintain the stud 139 in engagement with the right hand end face of the bracket 137.

A pivotally mounted index pawl 143 is supported on a stud 144. The stud 144 is mounted on a bracket 145 which is in turn fixedly mounted on the base 10.

The notches 136 in the bar 135 are shaped so that when fluid under pressure is admitted into the cylinder chamber 128 to cause an indexing movement of the carriage 50 toward the right (Fig. 2), the angular face of the notch 136 engaging the face 143a of the pawl 143 serves to rock the pawl 143 in a counterclockwise direction to disengage the pawl from the notch 136. After the carriage is indexed to a predetermined extent, the released compression of the spring 146 serves to rock the pawl 143 in a clockwise direction into operative engagement with the next notch 136 on the bar 135. After the last groove has been ground on the work piece 58, the carriage 50 is indexed further toward the right (Fig. 9) during which movement the pawl 143 rides on a cam face 136a to withdraw the pawl 143 out of engagement with the notch 136. The cam 136a is arranged to rock the pawl 143 a greater distance than during the normal indexing movement thereof until a leaf spring 147 engages the top face 143a of the pawl 143 to latch it in an inoperative position so as to facilitate a return transverse movement of the carriage 50 toward the right to a starting position. The pawl 143 is held in an inoperative position during the return stroke until a cam face 149 on the bracket 138 engages an arm 152 which is formed integral with the pawl 143. The cam 149 serves to rock the arm 152 and the pawl 143 in a clockwise direction into operative engagement with the first or right hand end notch 136 on the bar 135.

To facilitate automatic control of the indexing movement in timed relationship with the other operating mechanisms of the machine, a plurality of limit switches are arranged to be actuated by and in timed relation with the indexing movement of the bar 135 and the pawl 143. An adjustably mounted screw 150 is provided in the right hand end of the bar 135. The screw projects through an aperture formed in the bracket 138 and is arranged to engage the actuating plunger of a normally closed limit switch LS3. An adjustably mounted actuating screw 153 is carried by the arm 152. The screw 153 is arranged when positioned as shown in Figure 9 to hold a normally closed limit switch LS6 open. An adjustably mounted actuating screw 155 is carried by the pawl 143. The screw 155 is arranged to open a normally closed limit switch LS5 when the pawl 143 is rocked in a counter-clockwise direction out of engagement with a notch 136 in the bar 135.

It is desirable to provide an automatically actuated mechanism for causing an intermittent, incremental down-feeding movement of the grinding wheel 25 at the ends of the stroke to feed the wheel downwardly into the groove until the groove has been ground to a predetermined size. This mechanism is preferably arranged so that after a groove has been ground to the required depth, the wheel is automatically and rapidly moved vertically to an inoperative position. This mechanism may comprise a gear wheel 165 (Figs. 7 and 8) which is keyed to the outer end of the shaft 45. A rock arm 166 is pivotally supported on a hub 167 of a flanged member 168. The flanged member 168 is fastened to the outer end of a casing 169 which supports the shaft 45. A feed pawl arm 170 is pivotally supported on a stud 171. The feed pawl arm 170 is provided at its lower end with a small gear 172 which is arranged to mesh with the large gear 165. The small gear 172 is preferably supported by a ball clutch (not shown) which is arranged so that when the arm 170 is rocked in a counter-clockwise direction, the gear 172 is locked against rotation so that it will impart a counter-clockwise rotary motion to the large gear 165. Rotary motion of the gear 165 is transmitted through the shaft 45, beveled gear 44, beveled gear 43, feed screw 40 to impart a vertical feeding movement to the vertically movable wheel slide 11. The ball clutch within the gear 172 is arranged so that when the pawl arm 170 is moved in a clockwise direction, the gear 172 is free to rotate and rolls idly over the teeth of the large gear 165.

Figure 7:
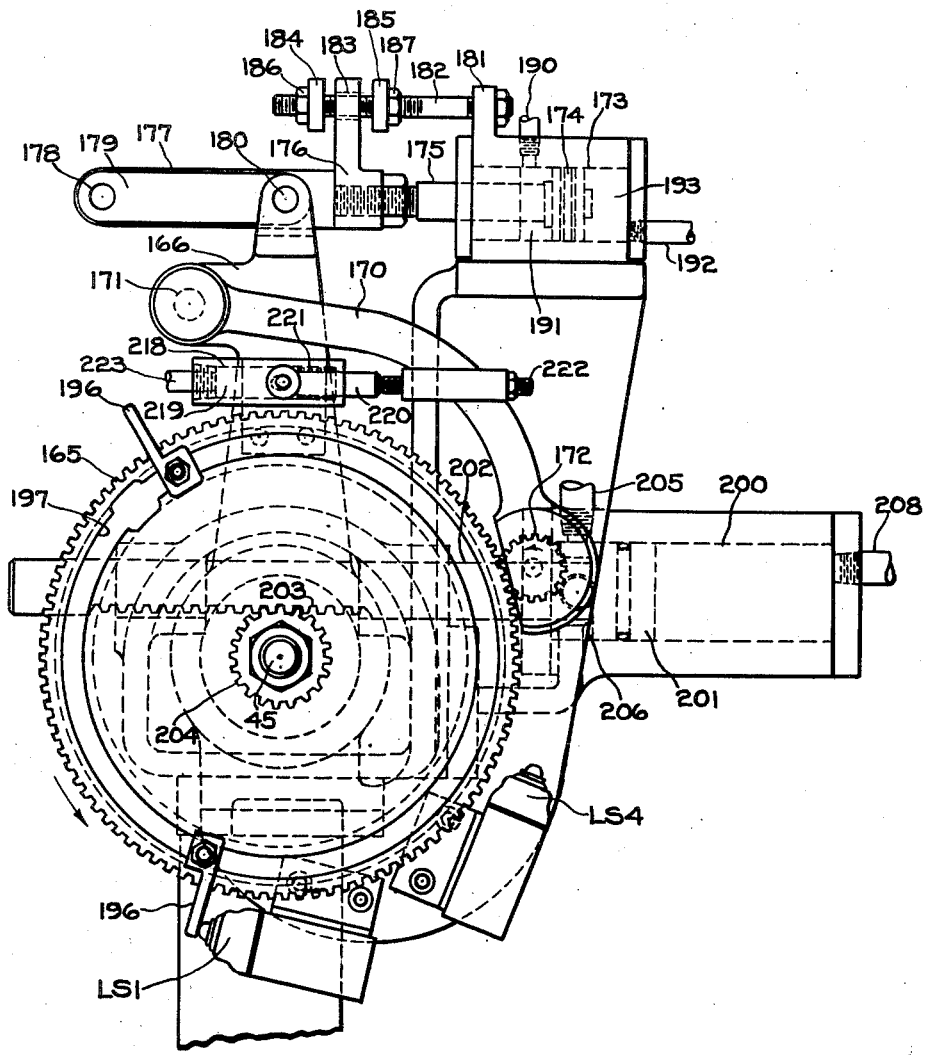
Fig. 7 is a fragmentary front elevation of the wheel feeding mechanism for vertically feeding the grinding wheel relative to the work supporting table.

A hydraulically operated mechanism is provided for automatically actuating the pawl arm 170 in timed relationship with the table reciprocation so that the down-feeding movement occurs at the ends of the table stroke. This mechanism may comprise a hydraulic cylinder 173 which contains a slidably mounted piston 174 (Figs. 2 and 7). The piston 174 is mounted on one end of a piston rod 175, the other end of which is connected to a vertically extending bracket 176. The bracket 176 is provided with a horizontally extending arm 177 which is connected by a stud 178 with one end of a link 179. The other end of the link 179 is connected by a stud 180 which is supported by a yoked projection at the upper end of the rock arm 166.

In order to adjust the stroke of the pawl arm 170 during each feeding movement, an upwardly extending lug 181 is supported on the cylinder 173. The lug 181 serves as a support for a rod 182 which passes through a clearance hole 183 formed in the bracket 176. A pair of stop collars 184 and 185 are screw threaded onto the rod 182 so that they may be adjusted longitudinally thereon. A pair of lock nuts 186 and 187 are provided for locking the stop collars 184 and 185 in adjusted positions. It will be readily apparent from the foregoing disclosure that by adjusting the position of the stop collars 184 and 185, the extent of oscillation of the rock arm 166 and the pawl arm 170 may be varied as desired.

Fluid under pressure passing through the pipe 73 from the pump 72 is directly connected through a pipe 190 with a cylinder chamber 191. Due to the relatively large diameter of the piston rod 175, the effective area of the piston 174 on the left hand end thereof is considerably less than the effective area of the piston 174 in the right hand cylinder chamber (Figs. 2 and 7). Fluid pressure is at all times supplied to the cylinder chamber 191. When it is desired to produce a down-feeding movement, a shot of fluid under pressure from the pipe line 190 is passed through a feed control valve 194, through a pipe 192 into a cylinder chamber 193. Due to the differential in piston areas, the piston 174 will move toward the left (Figs. 2 and 7) to cause a counter-clockwise movement of the rock arm 166 and the pawl arm 170 to cause a counter-clockwise rotary motion to be imparted by the small gear 172 to the large gear 165, thus producing a down-feeding movement of the grinding wheel 25. The feed control valve 194 is a piston type valve which is identical with that shown in the prior U. S. patent to Wallace H. Wood, No. 2,080,976. Consequently, this valve will not be described in detail. In the position of the parts as shown in Figures 2, 7 and 12, fluid within the cylinder chamber 193 is free to exhaust through the pipe 192, through the valve 194 and exhaust into the reservoir 70. The valve 194 is arranged to be actuated by and in timed relationship with the table control valve 74 so that when the valve 74 is reversed at the end of the stroke of the table 55, the valve 194 will be moved in a direction toward the right (Fig. 12) so that fluid under pressure in the pipe 73 will be admitted through the pipe 192 into the cylinder chamber 193 to cause a down-feeding movement of the grinding wheel 25.

In order that the down-feeding movement of the grinding wheel 25 may be synchronized with other mechanisms of the machine, a pair of adjustable dogs 195 and 196 are supported by a T slot formed in the front face of the gear 165. As the grinding wheel is incrementally and intermittently fed downwardly, the gear 165 is rotated in a counter-clockwise direction. This movement continues until the grinding wheel 25 has ground to a predetermined depth at which time the dog 196 is arranged to close a normally open limit switch LS1. When the gear 165 is rotated in a clockwise direction to raise the grinding wheel 25 vertically to an inoperative position, the counter-clockwise rotation continues until the dog 195 actuates a double pole, double throw limit switch LS4 to terminate the up-feeding movement and to automatically initiate a transverse indexing movement of the carriage 50 in a manner to be hereinafter described.

It is desirable to provide a rapid return stroke of the grinding wheel to an inoperative position. This is preferably accomplished by means of a hydraulic cylinder 200 which contains a slidably mounted piston 201 (Figs. 2 and 7). The piston 201 is connected to one end of a piston rod 202 which is provided with rack teeth 203. The rack teeth 203 mesh with a gear 204 which is fixedly mounted on the hub of the beveled gear 44. It will be readily apparent that when fluid under pressure is passed through a pipe 205 into a cylinder chamber 206, the piston 201 will be moved rapidly toward the right (Figs. 2 and 7) to cause a reverse rotation of the vertical feed screw 40 to raise the grinding wheel 25 rapidly to an inoperative position. During this movement of the piston 201 fluid within a cylinder chamber 207 may exhaust through a pipe 208 into the reservoir 70. A suitable control valve 209 is provided for controlling the admission of fluid under pressure to the cylinder 200. The valve 209 is preferably a solenoid actuated valve which is normally held in the position illustrated in Fig. 2 by means of a spring (not shown). This valve preferably comprises a valve stem 210 having valve pistons 211, 212 and 213 formed integrally therewith. Fluid under pressure in the pipe 73 passes through a pipe 214 to the valve 209. When it is desired to cause an upward movement of the grinding wheel 25, a solenoid S2 is energized to shift the valve stem 210 toward the right (Fig. 2) so that fluid under pressure in the pipe 214 passes into a valve chamber located between the valve pistons 211 and 212 and passes through the pipe 205 into the cylinder chamber 206 to cause a rapid movement of the piston 201 toward the right to raise the grinding wheel 25 and its supporting slide 11 rapidly to an inoperative position.

During incremental down-feed of the grinding wheel 25 as caused by the feed pawl arm 170 and small gear 172, it is desirable to provide a free exhaust of fluid from the cylinder chamber 206. In the position of the valve 209 (Fig. 2) fluid exhausting through the pipe 205 passes through the cylinder chamber located between the valve pistons 211 and 212 and passes outwardly through an exhaust pipe 215 into the reservoir 70.

During rapid return movement of the gear 165, it is desirable to provide suitable means for disengaging the gear 172 on the feed pawl arm 170 from the teeth of the gear 165. This is preferably accomplished by a hydraulic cylinder 218 which is supported on the rock arm 166. The cylinder 218 contains a slidably mounted piston 219 having a piston rod 220 which engages the end of an adjustable screw 222 carried by the feed pawl arm 170. When it is desired to disengage the gear 172, fluid under pressure may be admitted through a pipe 223 into the cylinder 218 to cause the piston 219 to move toward the right (Figs. 2 and 7) to swing the feed pawl arm 170 in a counter-clockwise direction on its pivot stud 171, thereby disengaging the gear 172 from the gear 165. It is desirable that the gear 172 be disengaged slightly before or at the time the gear 165 is moved in a clockwise direction to cause an upward movement of the grinding wheel. This is preferably accomplished by connecting the pipe 205 with the pipe 223. When fluid under pressure is admitted through the pipe 205, it also passes through the pipe 223 to the cylinder 218. Due to the fact that less pressure is required to swing the feed pawl arm 170 to an inoperative position than is required to turn the vertical feed screw 40, the former will be actuated first to disengage the gear 172 before the gear 165 starts its rotation in a clockwise direction.

A conventional reversing mechanism is provided for actuating the table reversing or control valve 74 to change the direction of movement of the table 55 as desired. In the preferred construction, a pair of adjustable dogs 230 and 231 are adjustably mounted in a T-slot 232 on the front edge of the table 55. The dogs 230 and 231 are arranged to engage the inner end of a reverse control lever 233 which is mounted on the upper end of a rotatable vertically arranged sleeve 234 which is journalled in the transversely movable carriage 50.

In order that the table may be reversed with a minimum amount of vibration, it is desirable to provide a lost motion connection between the reversing lever 233 and the reversing valve 74, so that during the initial movement of the reversing lever under the influence of the table dogs, the valve is not moved. This mechanism preferably comprises a relatively short arm 235 which is mounted on the lower end of the vertical sleeve 234. A pivotally mounted plate or lever 236 is supported on a stud 237 which is fixedly mounted on the carriage 50 (Fig. 1). The lever 236 is provided with a stud 238 which engages a groove 239 formed in the stem of the reversing valve 74. A suitable yieldable connection is provided between the short arm 235 and the pivotally mounted plate 236 which comprises a link 240 pivotally connected by a stud 241 with the plate 236. The link 240 slidably supports one end of a second link 242. The other end of the link 242 is connected by a stud 243 with the short arm 235. A spring 244 is interposed between projections of the links 240 and 242 so that when the reverse lever 233 is moved in either direction by means of the table dogs 230 and 231, the spring 244 serves to take up the initial movement thereof so that movement of the reversing valve 74 may be picked up without a sudden shock or vibration being transmitted thereto.

An adjustable table dog 245 is supported by the T-slot 232 and is arranged in the path of the actuating roller of a normally open limit switch LS2 (Fig. 2) to facilitate automatic indexing of the carriage 50 in timed relation with the longitudinal reciprocating motion of the table 55 as will be more fully described hereinafter.

In order that the vertically movable grinding wheel slide 11 may be actuated in timed relation with the reciprocation of the table 55 so that a down-feed of the grinding wheel 25 takes place at the end of the table stroke, it is desirable to provide the piston type feed control valve 194 which is actuated by and in timed relation with the table reversing mechanism. As illustrated in the drawings, the control valve 194 is a piston type valve having a slidably mounted piston 247. The valve piston 247 is arranged so that it may be actuated in timed relation with the reversing lever 233. In the preferred construction, a cam 248 which is moved by and in timed relation with the reversing lever 233 serves to engage a roller 249 which is mounted on the end of the valve piston 247 (Fig. 12) so that the valve pistons may be moved when the reversing lever 233 is shifted. In the position illustrated in Fig. 12, fluid is conveyed to the control valve 194 through a pipe 73 into a valve chamber 250. In this position of the valve fluid within the cylinder chamber 193 may exhaust through the pipe 192 into a valve chamber 253 and exhaust through a pipe 254. When the reversing lever 233 is actuated by either of the table dogs 230 or 231 to cause a reversal of the table 55, the cam 248 is swung in an arcuate path to engage the roller 249 and shift the valve piston 247 toward the right (Fig. 12) in which position fluid under pressure within the valve chamber 250 may pass through the port 251, through the pipe 192 into the cylinder chamber 193. Due to the relatively large effective area of the right hand side of piston 174, the piston 174 will be moved toward the left (Fig. 2) to cause a down-feeding movement of the grinding wheel 25 at each end of the table stroke.

A suitable adjusting means is provided for regulating and controlling the position of the cam 248. As illustrated in the drawings (Fig. 12), this adjusting mechanism may comprise a manually operable lever 255 which is fixedly mounted on a collar 256. The collar 256 is mounted on the upper end of a rotatable sleeve 257 which surrounds the sleeve 234 and is rotatably journalled in the carriage 50. The lower end of the sleeve 257 is provided with a gear segment 258 which meshes with a small gear 259 mounted on the cam 248. The cam 248 and the gear 259 are supported on a vertically arranged stud 260. By manipulation of the lever 255, the position of the cam 248 may be adjusted relative to the actuating roller 249 so that a down-feeding movement of the slide 11 may be obtained at either or both ends of the table stroke.

The machine may be set up for automatically grinding a grooved or fluted work piece 58 having any number of grooves or flutes. A notched index bar 135 is provided having the same number of notches which are spaced in accordance with the spacing on the work piece to be ground. If it is desired to change the set-up, it is merely necessary to change the notched index bar 135 for one having the proper number and proper spacing of the notches 136.

*Operation*

After the machine has been set up, the knob 92 of the start-stop valve 90 is moved toward the left (Fig. 2) thereby admitting fluid under pressure through the table reverse valve 74 to the table cylinder 60 to start the table 55 traversing toward the left (Fig. 1). Actuation of valve 90 serves to close the limit switch LS7 in the relay CR line. At each reversal of the table 55, reverse lever 233 swings the cam 248 so as to actuate the feed control valve 194 thereby admitting a shot of fluid under pressure to the cylinder chamber 193. The piston 174 moves toward the left (Fig. 2) to swing the feed pawl arm 170 in counter-clockwise direction so as to rotate the feed screw 40 and thereby feed the grinding wheel 25 and the wheel slide 28 downwardly by a predetermined increment at each reversal of the table 55. As the index gear 165 turns in a counter-clockwise direction, the dog 195 recedes from the switch LS4. Actuation of the switch LS4 renders the CR1 circuit operative. When groove or flute in the work piece has been ground to the desired depth, the dog 196 contacts and closes the switch LS1. Nothing happens until the carriage 50 reaches the right hand end position at which point the table dog 245 closes the limit switch LS2. When the limit switches LS1 and LS2 are both closed, the relay CR is energized which does two things: (1) energizes solenoid S1 to close valve 262 in the table pressure line to stop reciprocation of the table 55, and (2) energizes relay CR1. Energizing relay CR1 does three things: (1) closes the CR1 contact in the relay CR line to hold that circuit when the dog 196 leaves the limit switch LS1; (2) energizes the solenoid S2 to actuate the valve 209 so as to admit fluid under pressure into cylinder chamber 206 to cause a rapid up movement of the grinding wheel 25 and the wheel slide 28 to an inoperative position; (3) closes the CR1 contact in the CR2 line to energize relay CR2. Relay CR2 has three contactors which function as follows: (1) one contactor in the CR line to hold it while LS4 is opening the CR1 line and closing relay CR3; (2) one contactor in the CR3 line to set that circuit and control it; (3) one contactor closing a holding circuit for the relay CR2.

When the vertical feed mechanism above described returns the slide 28 to a predetermined height, the dog 195 (Fig. 2) on the index wheel 165 moving in a clockwise direction actuates the limit switch LS4. Limit switch LS4 is a double pole, double throw switch. Actuation of switch LS4 by dog 195 first opens the CR1 line to deenergize relay CR1 which does three things: (1) deenergizes solenoid S2 to shift the valve 209 (Fig. 2) so as to stop the vertical return feed of the grinding wheel 25 and slide 28; (2) opens the CR1 contact in the CR line (which is now held by CR2); (3) opens the CR1 contact in the CR2 line (which is now held by its own interlock). CR2 is thus controlling all three of the remaining circuits. Actuation of switch LS4 also closes its other contact which energizes relay CR3 (since switch LS7 is still closed and relay CR2 has just closed), limit switch LS6 is open since index pawl 143 is at the bottom of a notch 136. Closing relay CR3 does two things: (1) it energizes solenoid S3 to shift valve 130 toward the right (Fig. 2) so as to admit fluid under pressure to cylinder chamber 128 to initiate a transverse indexing movement of the carriage 50 toward the right (Fig. 2), and (2) it closes a safety holding contact in the CR circuit.

When the limit switch LS4 is actuated by dog 195 closing the relay CR3 line and energizing solenoid S3 to shift the valve 130, fluid under pressure is admitted to the cylinder chamber 128 of the cylinder 117 to index the carriage 50, with the index bar 135 toward the right. Pressure on the bar 135 is released and the spring 140 forces it toward the left relative to the carriage 50 so as to allow limit switch LS3 to close. The movement of the bar 135 toward the left is limited by engagement of the stud 139 with the bracket 137. The index pawl 143 rocks on the stud 144 and slides down the inclined face of a tooth 136 on the bar 135. Rocking of the pawl 143 in a counter-clockwise direction raises the arm 152 away from the actuating roller of the limit switch LS6 which allows it to close. As the pawl slides over the high point of a notch 136, the screw 155 (Fig. 9) engages and actuates the limit switch LS5 to open the same. Opening of switch LS5 serves to open the relay CR2 circuit but there is no immediate effect since the CR3 line is held by limit switch LS6 and the CR line is held by CR3 and LS3.

When the pawl 143 rides over the high point, the released compression of spring 146 rocks the pawl 143 in a clockwise direction (Fig. 9) into engagement with the next notch 143 on the bar 135. During this movement, the arm 152 moving in a clockwise direction opens the limit switch LS6. Opening of switch LS6 opens CR3 line to deenergize the solenoid S3 and thereby allowing the valve 130 to shift into the position illustrated in Fig. 2 which leaves only switch LS3 holding the CR line. Deenergizing solenoid S3 and shifting valve 130 serves to reverse the flow of fluid under pressure and admits fluid under pressure to the cylinder chamber 126 to move the carriage 50 toward the left (Fig. 2). This movement of the carriage 50 moves the vertical face of the notch 136 into engagement with the corresponding face on the pawl 143. The bar 135 is shifted toward the right relative to the carriage 50 and the screw 150 carried by the bar 135 engages and opens switch LS3. With the parts in this position, the pawl 143 and notch 136 serve precisely to position the carriage 50 for grinding the next flute or groove in the work piece 58.

Opening of limit switch LS3 serves to open the CR line since switch LS1 was opened when the down feed dog 106 recedes, LS2 though still closed is in series with LS1 and has no effect, relay CR1 is opened by switch LS4, relay CR2 is opened by switch LS5, and relay CR3 is opened by the switch LS6. Opening the CR line deenergizes solenoid S1 thereby opening the valve 202 so as to allow fluid under pressure from the pump 72 to start the reciprocation of the table 55 to grind the next flute or groove in the work piece 58. This cycle is repeated until all of the grooves have been ground.

After the last groove has been ground, the carriage 50 indexes toward the right until the cam face 138a rides on the face 143a of the pawl 143 and rocks the pawl 143 in a counterclockwise direction until the leaf spring 147 engages the face 143a and thereby latches the pawl 143 in an inoperative position. During movement of the pawl 143 to this position, screw 155 opens switch LS5 and prevents actuation of switch LS6. In this position relay CR3 is deenergized so as to deenergize solenoid S3 reversing the valve 130 to cause the carriage 50 to move rapidly toward the left (Fig. 2) into its initial position for the next grinding operation. The table 55 remains in the extreme right hand end position (Fig. 1) until the actuating knob 92 is moved toward the right (Fig. 2) to shift the start-stop valve 90 to a tablestop position. This movement of the knob 92 opens switch LS7 to open relay CR3, deenergizing solenoid S3 and thus rapidly moving the carriage 50 toward the left as above described. When the carriage 50 approaches its left hand or initial position (Fig. 2) the arm 152 of the pawl 143 engages a cam face 149 (Fig. 9) formed on the underside of the bracket 138 and continued movement of the carriage toward the left releases the pawl 143 from the spring 147. The cam 149 rocks the pawl 143 and the arm 152 in a clockwise direction so that the released compression of the spring 146 will move the pawl 143 into engagement with the right hand end notch 136 on the bar 135. The carriage 50 continues movement toward the left until the pawl 143 slides the bar 135 toward the right relative to the carriage 50 until the end of the bar 135 engages the stop face 138a on the bracket 138. During this latter movement, the screw 150 actuates and opens switch LS3 thus opening the CR circuit thus completing a cycle of operation. The ground work piece may then be removed from the table 55 and a new work piece loaded thereon. When it is desired to start the next grinding cycle, after a new work piece has been loaded, the knob 92 is manually moved toward the left into a table start position and the grinding cycle is automatically repeated.

It will thus be be seen that there has been provided by the invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a grinding machine having a longitudinally reciprocable table, a transversely movable carriage therefor, a rotatable grinding wheel, a vertically adjustable slide for said wheel, reciprocating mechanism to reciprocate said table, a reversing mechanism therefor including a reversing lever and table dogs, means including a pawl and ratchet mechanism to feed said slide in a substantially vertical direction toward the table, operative connections actuated by and in timed relation with the table reversing lever to actuate said pawl and ratchet mechanism at each end of the table stroke, an independent mechanism rapidly to move said wheel slide upwardly to raise the grinding wheel to its initial position after a predetermined grinding operation has been completed, and an indexing mechanism to index the carriage transversely successively to locate a piece of work to be ground on predetermined grinding positions.

2. In a grinding machine having a longitudinally reciprocable table, a transversely movable carriage therefor, a rotatable grinding wheel, a vertically adjustable slide for said wheel, a hydraulic piston and cylinder to reciprocate said table, a reversing valve therefor, a reversing lever and table dogs to actuate said valve, means including a hydraulically operated pawl and ratchet mechanism to feed said slide in a substantially vertical direction toward the table, a feed control valve actuated by and in timed relation with the table reversing lever to actuate said pawl and ratchet mechanism at each end of the table stroke, a hydraulic piston and cylinder rapidly to move said wheel slide upwardly to raise the grinding wheel to its initial position after a predetermined grinding operation has been completed, and a hydraulic piston and cylinder operatively connected to index the carriage transversely successively to locate a work piece to be ground in predetermined positions for grinding.

3. In a grinding machine having a longitudinally reciprocable work table, a transversely movable carriage therefor, a rotatable grinding wheel, a vertically adjustable slide for said wheel, a hydraulic piston and cylinder to reciprocate said table, a reversing valve therefor, a reversing lever and table dogs to actuate said valve, means including a nut and screw mechanism to feed said slide, a pawl and ratchet mechanism to actuate said screw in one direction to feed said slide in a substantially vertical direction toward the table, operative connections actuated by and in timed relation with the table reversing lever to actuate said pawl and ratchet mechanism at each end of the table stroke, an independent mechanism rapidly to rotate said feed screw in the opposite direction to move said slide upwardly to its initial position after a predetermined grinding operation, and a hydraulic piston and cylinder to index the carriage transversely successively to locate a work piece to be ground in predetermined positions for grinding.

4. In a grinding machine having a longitudinally reciprocable work table, a transversely movable carriage therefor, a rotatable grinding wheel, a vertically adjustable slide for said wheel, a reciprocating mechanism to reciprocate said table, a reversing mechanism including a reversing lever, means including a pawl and ratchet mechanism to feed said slide in a substantially vertical direction toward the table, operative connections actuated by and in timed relation with the table reversing lever to actuate said pawl and ratchet mechanism at each end of the table stroke, an independent mechanism rapidly to move said wheel slide upwardly to raise the grinding wheel to its initial position after a predetermined grinding operation has been completed, an indexing mechanism including a notched index bar and a pawl to facilitate a precise indexing movement of said carriage successively to locate said table in predetermined positions for grinding spaced portions on a work piece, and a stop mechanism actuated by and in timed relation with said carriage indexing mechanism to stop the grinding cycle after a predetermined number of portions on a work piece have been ground to a predetermined extent.

5. In a grinding machine having a longitudinally reciprocable table, a transversely movable carriage therefor, a rotatable grinding wheel, a vertically adjustable slide for said wheel, a hydraulic piston and cylinder to reciprocate said table, a reversing valve therefor, a reversing lever and table dogs to actuate said valve, a nut and screw mechanism to feed said wheel slide in a substantially vertical direction, a pawl and ratchet mechanism to actuate said screw in one direction, a piston and cylinder to actuate said pawl, a feed control valve actuated by and in timed relation with the reverse lever to admit fluid under pressure to the latter cylinder to actuate the pawl and ratchet at each end of the table stroke, an electrically controlled hydraulic piston and cylinder rapidly to rotate said feed screw in the opposite direction to raise the grinding wheel and wheel slide to an initial position after a predetermined grinding operation has been completed, an electrically controlled hydraulic piston and cylinder to index the carriage transversely, and means including an index bar and pawl successively to locate said carriage and work piece in predetermined positions for grinding.

6. In a grinding machine having a base, a longitudinally reciprocable work table, a transversely movable carriage therefor, a rotatable grinding wheel, a vertically adjustable slide for said wheel, means to swivel said wheel slide in a vertical plane to facilitate grinding a plurality of spaced parallel under-cut grooves in a work piece, a hydraulic piston and cylinder to reciprocate said table, a reversing valve therefor, a reversing lever and table dogs to actuate said valve, a nut and screw mechanism to feed said slide toward and from said table, a pawl and ratchet mechanism to actuate said screw in one direction, a piston and cylinder to actuate said pawl, a feed control valve actuated by and in timed relation with the reversing lever to admit fluid under pressure to said pawl cylinder at each end of the table stroke, an electrically controlled hydraulic piston and cylinder rapidly to rotate said feed screw in the opposite direction, a solenoid actuated control valve to admit fluid under pressure to said latter cylinder rapidly to raise said grinding wheel slide to an initial position, a hydraulic piston and cylinder to index the carriage transversely, and means including a solenoid actuated valve therefor which is energized when the wheel slide is raised to its initial position to admit fluid under pressure to the carriage index cylinder to index the carriage transversely so as to locate the work piece to be ground successively in predetermined grinding positions.

7. In a grinding machine having a base, a longitudinally reciprocable work table, a transversely movable carriage therefor, a rotatable grinding wheel, a vertically adjustable slide for said wheel, a hydraulic piston and cylinder to reciprocate said table, a reversing valve therefor, a reversing lever and table dogs to actuate said valve, a nut and screw mechanism to feed said slide in a substantially vertical direction, a pawl and ratchet mechanism to actuate said screw in one direction, a piston and cylinder to actuate said pawl, a feed control valve actuated by and in timed relation with the reversing lever to admit fluid under pressure to said pawl cylinder at each end of the table stroke, an electrically controlled hydraulic piston and cylinder rapidly to rotate said feed screw in the opposite direction, a solenoid actuated control valve to admit fluid under pressure to said latter cylinder rapidly to raise said grinding wheel slide to an initial position, a hydraulic piston and cylinder to move said pawl out of engagement with the ratchet wheel during the rapid return movement of the grinding wheel, a hydraulic piston and cylinder to index the carriage transversely, and means including a solenoid actuated valve therefor which is energized when the wheel slide is raised to its initial position to admit fluid under pressure to the carriage index cylinder to index the carriage transversely so as to locate the work piece to be ground successively in predetermined grinding positions.

8. In a grinding machine as claimed in claim 7, in combination with the parts and features therein specified of a pair of adjustable dogs on said ratchet wheel, and an independent limit switch actuated by each of said dogs, one of said limit switches being connected to energize the solenoid actuated valve when the grinding wheel has ground to a predetermined depth so as to admit fluid under pressure to cause a rapid movement of the wheel slide to an inoperative position, the other of said limit switches being connected to energize the second solenoid actuated valve to admit fluid under pressure to the carriage index cylinder so as to index the carriage and work piece successively into predetermined positions relative to the grinding wheel for grinding spaced portions on the work piece.

9. In a grinding machine as claimed in claim 7, in combination with the parts and features therein specified of a manually operable start-stop valve to facilitate starting and stopping the table, a normally open solenoid valve which is closed when energized to stop the table reciprocation, a relay to control said solenoid, and a pair of limit switches which are connected in series with said relay, one of said switches being actuated by the downfeed dog on said ratchet wheel, the other of said switches being actuated by a table dog when the table is at one end of its stroke, said switches being arranged when closed to energize said relay thereby closing said solenoid valve to stop the table reciprocation during the indexing movement of said carriage.

10. In a grinding machine having a base, a longitudinally reciprocable work table, a transversely movable carriage therefor, a rotatable grinding wheel, a vertically adjustable slide for said wheel, a hydraulic piston and cylinder to reciprocate said table, a reversing valve therefor, a reversing lever and table dogs to actuate said valve, a nut and screw mechanism to feed said slide in a substantially vertical direction, a pawl and ratchet mechanism to actuate said screw in one direction, a piston and cylinder to actuate said pawl, a feed control valve actuated by and in timed relation with the reversing lever to admit fluid under pressure to said pawl cylinder at each end of the table stroke, an electrically controlled hydraulic piston and cylinder rapidly to rotate said feed screw in the opposite direction, a solenoid actuated control valve to admit fluid under pressure to said latter cylinder rapidly to raise said grinding wheel slide to an initial position, a hydraulic piston and cylinder to move said pawl out of engagement with the ratchet wheel during the rapid return movement of the grinding wheel, a hydraulic piston and cylinder to index the carriage transversely, a solenoid actuated control valve therefor, and a limit switch which is actuated when the wheel slide is raised to its initial position to admit fluid under pressure to the carriage index cylinder to index the carriage transversely so as to locate the work piece to be ground successively in predetermined grinding positions.

11. In a grinding machine as claimed in claim 10, in combination with the parts and features therein specified of a piston and cylinder to index said carriage transversely, a notched index bar slidably supported on said carriage, a pivotally mounted pawl on said base, said index bar and pawl serving precisely to locate said carriage successively in a plurality of predetermined spaced grinding positions, a normally open solenoid valve in the pressure line, an electrical relay to energize said valve to stop reciprocation of the table during a transverse indexing movement of the carriage, and a limit switch actuated by endwise movement of the index bar when the carriage moves into an indexed position to deenergize said relay and solenoid valve and thereby start table reciprocation to repeat the grinding cycle.

12. In a grinding machine as claimed in claim 10, in combination with the parts and features therein specified of a manually operable start-stop valve to start reciprocation of the work table, a limit switch actuated by movement of said valve to a start position to render an electric circuit operative, electrically controlled means including a limit switch to interrupt the grinding cycle when the grinding wheel has been fed downwardly to grind a work piece to a predetermined extent, said second limit switch serving to energize a solenoid valve to stop the table reciprocation when the table is at one end of its stroke, and electrically operated means including a relay to energize the carriage index solenoid control valve to impart a transverse indexing movement to said carriage.

13. In a grinding machine as claimed in claim 10, in combination with the parts and features therein specified of a manually operable start-stop valve to start reciprocation of the work table, a limit switch actuated by movement of said valve to a start position to render an electric circuit operative, electrically controlled means including a limit switch to interrupt the grinding cycle when the grinding wheel has been fed to a predetermined extent, said second limit switch serving to energize a solenoid valve to stop table reciprocation when the table is at one end of its stroke, electrically operated means including a relay to energize the carriage index solenoid control valve to impart a transverse indexing movement to said carriage, and a limit switch actuated by endwise movement of the notched bar as the carriage reaches an indexed position to deenergize said solenoid valve so as to repeat the grinding cycle on another portion of the work piece.

14. In a grinding machine as claimed in claim 10, in combination with the parts and features therein specified of a manually operable start-stop valve to start reciprocation of the work table, a limit switch actuated by movement of said valve to a start position to render an electrical control circuit operative, electrically controlled means including a limit switch to interrupt the grinding cycle when the grinding wheel has been fed into a work piece to a predetermined extent, said second limit switch serving to energize a solenoid valve to stop table reciprocation when the table is at one end of its stroke, electrically operated control means including a relay to energize the carriage index solenoid control valve to impart a transverse indexing movement to said carriage, a limit switch actuated by endwise movement of the notched bar as the carriage reaches an indexed position to deenergize said solenoid valve to start the table reciprocation and thereby to repeat the grinding cycle on another portion of the work piece, and electrically operated control means including a limit switch actuated by said carriage index pawl when the start-stop valve is shifted to a stop position to deenergize the solenoid carriage index control valve so as to move the carriage transversely in a reverse direction to its initial position.

JOHN I. GARSIDE.

REFERENCES CITED

The following references are of record in the file of this patent:

UNITED STATES PATENTS

| Number | Name | Date |
| --- | --- | --- |
| 2,080,976 | Wood | May 18, 1937 |
| 2,113,287 | Baldenhofer | Apr. 5, 1938 |
| 2,127,877 | Maglott | Aug. 23, 1938 |
| 2,284,073 | Silven | May 26, 1942 |
| 2,360,671 | Haas et al. | Oct. 17, 1944 |